United States Patent [19]

Gitlin et al.

[11] 4,334,313
[45] Jun. 8, 1982

[54] TIMING RECOVERY TECHNIQUE

[75] Inventors: Richard D. Gitlin, Monmouth Beach; Howard C. Meadors, Jr., Ocean, both of N.J.

[73] Assignee: Bell Telephone Laboratories, Incorporated, Murray Hill, N.J.

[21] Appl. No.: 185,016

[22] Filed: Sep. 8, 1980

[51] Int. Cl.³ ............................................... H04B 3/04
[52] U.S. Cl. ...................................... 375/106; 333/18; 364/724; 375/13; 375/15
[58] Field of Search ........................... 375/106, 13, 15; 333/18; 364/724, 572, 581, 582; 328/162

[56] References Cited

U.S. PATENT DOCUMENTS 4,004,226  1/1977  Qureshi ................................. 375/13
4,237,554 12/1980  Gitlin .................................... 375/15

OTHER PUBLICATIONS

Bell System Tech. Journal, vol. 54, No. 3, Mar. 1975, pp. 569-593, "Timing Recovery and Scramblers in Data Transmission".
IEEE Trans. of Communications, vol. COM-24, No. 8, Aug. 1976, pp. 856-864, "Fractional Tap-Spacing Equalizer and Consequences for Clock Recovery in Data Modems."

Primary Examiner—Howard Britton
Attorney, Agent, or Firm—Ronald D. Slusky

[57] ABSTRACT

In a first data receiver (10), sampling circuitry (20, 25, 35) forms samples of a received data signal representing a succession of data symbols. The samples are formed at twice the symbol rate. Transversal filter circuitry (251, 261) operates on the samples by multiplying them by respective ones of a queue of coefficients. Further circuitry (55, 60, 65, 70, 252, 262), operative in response to the resulting products, forms decisions as to the values of the transmitted symbols and updates the values of the coefficients. Timing recovery circuitry (40) periodically identifies the largest of the coefficients in magnitude and either advances or retards the operation of the sampling circuitry by a fixed step size depending on whether that coefficient is or is not within a predetermined portion of the queue. Timing recovery circuitry (830) within a second data receiver (100) operates in a similar manner, but employs a step size whose magnitude is determined by the position of the largest coefficient relative to the center of the coefficient queue.

24 Claims, 9 Drawing Figures

TIMING RECOVERY TECHNIQUE

BACKGROUND OF THE INVENTION

The present invention relates generally to data communications. The invention more particularly relates to timing recovery techniques used in data receivers which have automatic and/or adaptive equalizers.

Accurate reception of high-speed data signals transmitted over a bandlimited channel with unknown transmission characteristics requires the use of an automatic equalizer. The equalizer, which is resident in the receiver portion of a data set, or modem, is generally in the form of a transversal filter. Samples of the received data signal, referred to herein as line samples, are formed at a predetermined sampling rate. In a so-called T/2 equalizer, for example, the line samples are formed at twice the transmitted symbol rate. The line samples are applied to the transversal filter, in which each is multiplied by respective one of a queue of coefficients. The resulting products are added together and, if necessary, demodulated to generate a baseband signal, referred to herein as an equalizer output. The value of each equalizer output is used as the basis for forming a decision as to the value of a respective transmitted data symbol.

In addition, an error signal is formed equal to the difference between each equalizer output and a reference signal which represents its respective data symbol. In the so-called adaptive type of automatic equalizer, in particular, the reference signal is derived from abovementioned decision. The error signal is used to update, or adapt, the transversal filter coefficient values in such a way as to minimize a measure of the channel-induced distortion—assumed to be primarily intersymbol interference—in the equalizer outputs.

An important equalizer operating parameter, in addition to the rate at which the line samples are formed, is their time occurrence with respect to the received signal. This parameter is referred to as the timing epoch. The coefficient values subsisting in the equalizer at any given time will yield accurate equalization only if the received signal is sampled at or near a particular set of time points on the received signal, i.e., only if it is sampled with the appropriate timing epoch. The frequencies of the transmitter and receiver clocks invariably differ from one another, if only by a very small amount. Over time, this frequency difference, if not compensated for, would cause the received signal to be sampled further and further away from the appropriate time points, i.e., with an increasingly erroneous timing epoch. As long as the sampling frequency is high enough, the equalizer does have the ability to compensate for this clock frequency difference (as long as it is not too large) via the coefficient update process. This is not an effective long-term solution, however, because the distribution of coefficient values will eventually become skewed to one end of the coefficient queue and equalizer performance will degrade sharply.

To deal with this problem, the receiver is conventionally provided with a so-called timing recovery circuit. The timing recovery circuit determines whether the line samples are being formed earlier (later) than they should be and, in response, adjusts the phase of the line sample forming circuitry such that the line samples are formed a little later (sooner) than they otherwise would. This phase adjustment process is referred to as retarding (advancing) the receiver timing or, alternatively, as retarding (advancing) the sampling phase.

A commonly used timing recovery technique is so-called envelope-derived timing recovery, disclosed, for example, in the *Bell System Technical Journal*, Vol. 54, p. 569 et seq, March, 1975. This technique extracts a symbol-rate tone from the received signal and uses the phase of that tone to control receiver timing. Envelope-derived timing recovery performs satisfactorily for many applications. In some situations, however—such as a narrow rolloff system—the recovered tone may be so weak that accurate timing recovery is not possible when random data is being received.

An alternative timing recovery technique, referred to herein as "coefficient tracking," controls receiver timing as a function of coefficient distribution within the queue. In accordance with a typical coefficient tracking approach disclosed, for example, in U.S. Pat. No. 4,004,226, issued Jan. 18, 1977 to S. U. H. Qureshi et al., timing is adjusted such that the largest coefficient magnitude tends to remain at a designated "center" position in the coefficient queue. This is achieved by periodically, e.g., in each symbol interval, identifying the coefficient which has the largest magnitude. If it is found to be the center coefficient, no timing adjustment is made. Otherwise, the receiver timing is advanced or retarded, as appropriate, such that subsequent coefficient adaptation over a number of symbol intervals causes the magnitude of the center coefficient to ultimately become the largest.

SUMMARY OF THE INVENTION

The above-described coefficient tracking technique avoids many of the problems associated with envelope-derived timing recovery. Disadvantageously, however, it allows any one of three coefficients to have the largest magnitude, i.e., the center coefficient and those on either side of it. This corresponds to a potential timing drift of, for example, more than half a symbol interval in a T/2 equalizer. We have found that this amount of drift may, disadvantageously, stimulate a coefficient magnitude build-up of the type described in the commonly-assigned U.S. patent application of R. D. Gitlin et al., Ser. No. 16,495, filed Mar. 1, 1979, now U.S. Pat. No. 4,237,554 issued Dec. 2, 1980. A timing drift of this magnitude may be additionally disadvantageous in so-called extended networks—wherein communication between two modems is carried out via one or more intermediary modems—in that it may require an increase in the capacity of the elastic store used to allow the same clock signal to be used at the customer interface for transmission and reception of data.

The present invention is directed to an improved timing recovery technique. In accordance with the invention, the coefficient queue is divided into front and back portions only. That is, every coefficient is in one or the other portion and no one coefficient is designated to be the "center" coefficient. Receiver timing is adjusted such that two coefficients, one on either side of the boundary between the front and back portions are maintained substantially equal in at least some aspect—e.g., magnitude. This approach, we have found, advantageously restricts timing drift to a smaller fraction of a symbol interval than in the prior art, e.g., 5 to 10 percent in T/2 equalizer.

In an illustrative embodiment of the invention, as in the prior art, the location of a "reference" coefficient having a particular characteristic, e.g., largest magnitude, is repetitively identified. When the reference coefficient is found in the front portion (containing the coefficients with which the more recently formed line samples are multiplied), this indicates that receiver timing is to be retarded. Conversely, if the reference coefficient is found in the back portion, this indicates that receiver timing is to be advanced.

An advance or retard timing adjustment may be made each time the reference coefficient is located. Alternatively, an advance (retard) timing adjustment may be made when the number of advance (retard) indications which occurred since the last timing adjustment was made exceeds the number of retard (advance) indications by a predetermined amount greater than unity, e.g., 6. In either event, the result is that, in typical operation, the location of the reference coefficient tends to alternate (over a large number of symbol intervals) between the above-mentioned two coefficients.

The invention is illustrated herein in the context of an equalizer which uses complex (i.e., in-phase and quadrature) coefficients. In such applications, the reference coefficient may be, for example, that having (a) the largest complex magnitude (square root of the sum of the squares of the real and imaginary components), (b) the largest real component, (c) the largest imaginary component, (d) the largest component, real or imaginary, or (e) some other predetermined characteristic not directly related to magnitude. We have found (a) to be preferable in that the complex magnitude of an equalizer coefficient, unlike the respective magnitudes of its components, does not change with shifts in received carrier phase. Thus such shifts will not interfere with the timing recovery process.

DETAILED DESCRIPTION

Figure 1:
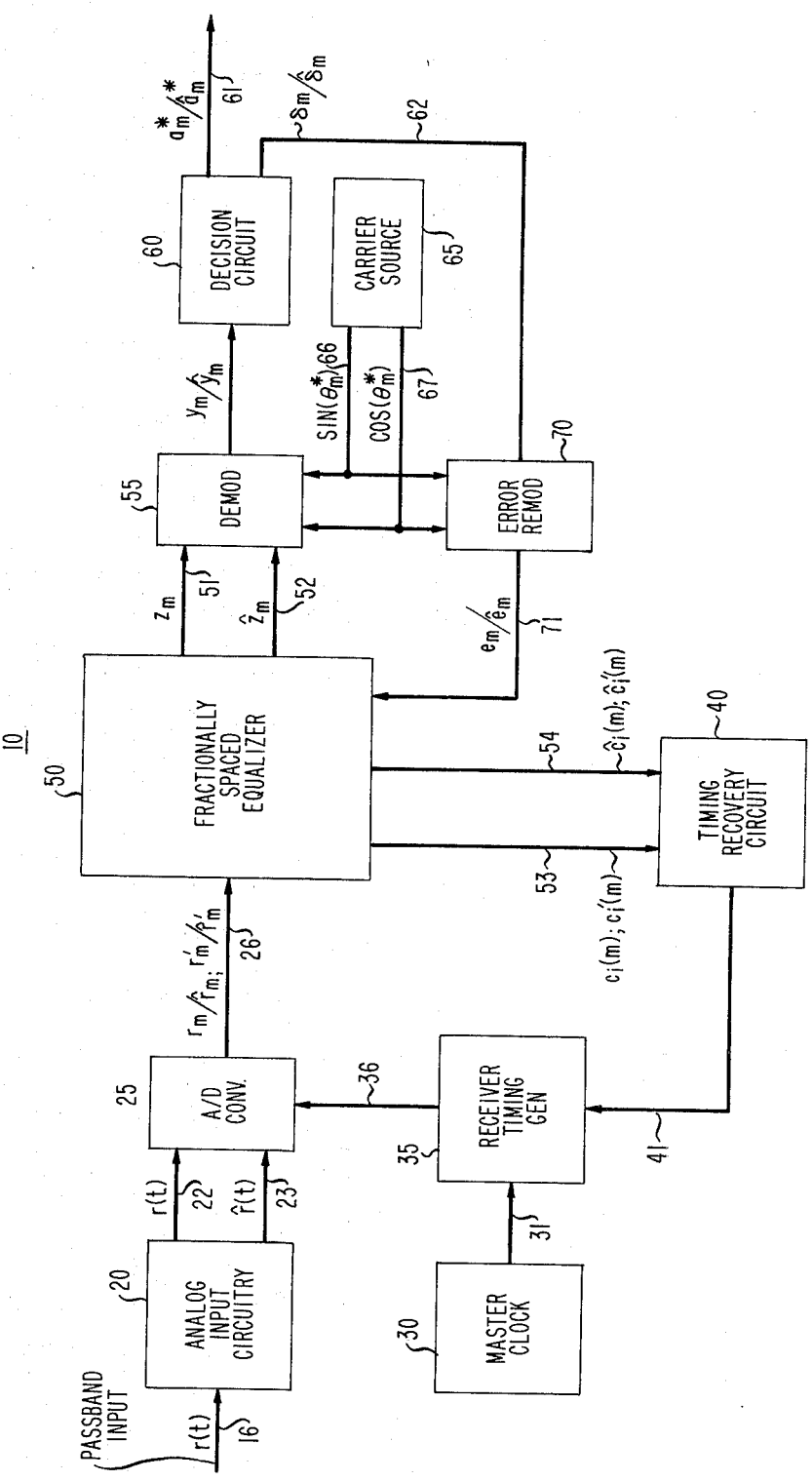
FIG. 1 shows a first illustrative embodiment of a data signal receiver, which employs a first realization of the present timing recovery technique.

Receiver 10 shown in FIG. 1 is adapted for use in a voiceband data modem in a communication system employing quadrature-amplitude modulation (QAM). (The invention is, however, applicable to transmission systems using other modulation schemes as well as to baseband systems.) In particular, four information bits, comprising a so-called data symbol, are communicated once every $T = 1/2400$ sec. The symbol rate is thus 2400 baud, yielding a binary data transmission rate of 9600 bits per second. The four bits to be transmitted are encoded into two signal levels, each of which can take on one of the four values $+1, -1, +3, -3$. The two signal levels amplitude modulate respective 1800 Hz in-phase and quadrature-phase carrier waves which, in combination, comprise the transmitted QAM signal.

The QAM signal, representing a succession of data symbols transmitted at a rate of $1/T$ symbols per second, is received by receiver 10 on lead 16. This passband input signal, $r(t)$, passes to analog input circuitry 20 comprised of a bandpass filter and Hilbert transform circuit. The output of circuitry 20 is comprised of a Hilbert transform pair $r(t)$ and $\hat{r}(t)$ derived from the received passband signal. These are passed to an A/D converter 25 on leads 22 and 23.

A master clock 30 generates 128 master clock pulses every T seconds on lead 31. These are received by receiver timing generator 35. The latter counts the pulses on lead 31 and generates timing signals on a number of output leads to control the sequencing of the various signal processing functions within the modem. One of these leads shown explicitly is lead 36. The latter extends pulses to A/D converter 25 at a rate which causes A/D converter 25 to generate line samples at $p/T$ sampler per second. The parameter p is illustratively equal to 2. A/D converter 25 thus generates two passband, i.e., modulated, line samples $R_m$ and $R_m'$ during the $m^{th}$ receiver symbol interval. (An alternative way of generating $R_m$ and $R_m'$ is to first sample and digitize the received signal at a rate at least equal to twice its highest frequency component and then pass the resulting signal through a digital phase-splitter.)

QAM signals are conveniently expressed and processed as complex numbers, each having a real and imaginary component. The real and imaginary components of the line samples formed by A/D converter 25 are provided one after the other in serial form as separate ten-bit digital signals, or words, on lead 26. (Each of the other signal leads similarly carries its signals in serial form.) Notationally, the real and imaginary components of sample $R_m$ are represented as $r_m$ and $\hat{r}_m$. Those of sample $R_m'$ are represented as $r_m'$ and $\hat{r}_m'$.

Line samples $R_m$ and $R_m'$, which are spaced $T/2$ seconds apart, are equalized by fractionally spaced equalizer 50 described hereinbelow. It suffices to say for the present that the outputs of equalizer 50 on leads 51 and 52 are generated once per symbol interval and are, respectively, the real and imaginary components $z_m$ and $\hat{z}_m$ of a passband equalizer output $Z_m$. (It should be noted at this point that, due to processing delay in equalizer 150, passband equalizer output $Z_m$ is not necessarily generated during the $m^{th}$ receiver interval, the latter being defined as the T second interval during which line samples $R_m$ and $R_m'$ are generated. The subscript m in "$Z_m$" thus does not identify when $Z_m$ is generated but, rather, identifies $Z_m$ as being the passband equalizer output which is generated as the result of the application of line samples $R_m$ and $R_m'$ to the equalizer. Similar considerations apply, for example, to signals $Y_m$, $A_m^*$, $\Delta_m$ and $E_m$ discussed below.)

Passband equalizer output $Z_m$ is demodulated to baseband by demodulator 55. The demodulated output of demodulator 55 is baseband equalizer output $Y_m$. Baseband equalizer output $Y_m$ is hereinafter referred to as equalizer output $Y_m$. It has real and imaginary components $y_m$ and $y_{\hat{m}}$, provided one after the other as twelve-bit words on lead 56. The demodulation process performed by demodulator 55 is expressed in complex notation as $$Y_m = Z_m e^{-j\theta_m^*}$$

where $\theta_m^*$ is an estimate of the carrier phase. In terms of real and imaginary components, the demodulation process is expressed as $$y_m = z_m \cos(\theta_m^*) + \hat{z}_m \sin(\theta_m^*)$$

$$\hat{y}_m = \hat{z}_m \cos(\theta_m^*) - z_m \sin(\theta_m^*).$$

For purposes of generating $y_m$ and $\hat{y}_m$ in accordance with the above expressions, demodulator 55 receives nine-bit digital representations of $\sin(\theta_m^*)$ and $\cos(\theta_m^*)$ on output leads 66 and 67 of carrier source 65.

Components $y_m$ and $\hat{y}_m$ are quantized in decision circuit 60. The resulting outputs, provided one after the other on lead 61, are decisions $a_m^*$ and $\hat{a}_m^*$ as to the signal levels which represent components $\hat{a}_m$ and $a_m$ of a particular transmitted symbol $A_m$. Decisions $\hat{a}_m^*$ and $a_m^*$ can be thought of as the real and imaginary components of a complex decision $A_m^*$.

Decision circuit 60 also provides, on lead 62, the real and imaginary components, $\delta_m$ and $\hat{\delta}_m$, of a complex baseband error signal $\Delta_m$ associated with the data symbol in question. Error signal $\Delta_m$ is equal to the quantity $(Y_m - A_m^*)$. In particular, $\delta_m = (y_m - a_m^*)$ and $\hat{\delta}_m = (\hat{y}_m - \hat{a}_m^*)$, with $\delta_m$ and $\hat{\delta}_m$ being expressed as respective twelve-bit words. Error signal $\Delta_m$ is remodulated in error remodulator 70 to yield a remodulated, or passband, error signal $E_m$ given by $$E_m = \Delta_m e^{+j\theta_m^*}.$$

The real and imaginary components of $E_m$, $e_m$ and $\hat{e}_m$, are generated by remodulator 70 in accordance with $$e_m = \delta_m \cos(\theta_m^*) - \hat{\delta}_m \sin(\theta_m^*)$$

$$\hat{e}_m = \delta_m \sin(\theta_m^*) + \hat{\delta}_m \cos(\theta_m^*).$$

In order to form these quantities, remodulator 70, like demodulator 55, receives $\sin(\theta_m^*)$ and $\cos(\theta_m^*)$ from carrier source 65.

(An alternative way of generating error signal $E_m$ would be to remodulate complex decision $A_m^*$ and subtract it from passband equalizer output $Z_m$. In either case, the value of $E_m$ is the same, it being equal to the difference, modulated at the carrier frequency, between the pre- and post-quantized values of equalizer output $Y_m$.)

Components $e_m$ and $\hat{e}_m$ are extended one after the other to fractionally spaced equalizer 50 on lead 71 for purposes of coefficient updating, as described below.

Fractionally spaced equalizer 50 equalizes the stream of samples applied to its input at T/2 second intervals by separating those samples into two streams of T-spaced samples. Each stream is passed through a respective transversal filter section adapted to filter samples spaced at T-second intervals. The outputs of the two filter sections are added together to generate the overall passband equalizer output. This structure provides the same filtering as would a single transversal filter with input samples spaced T/2 seconds apart.

Figure 2:
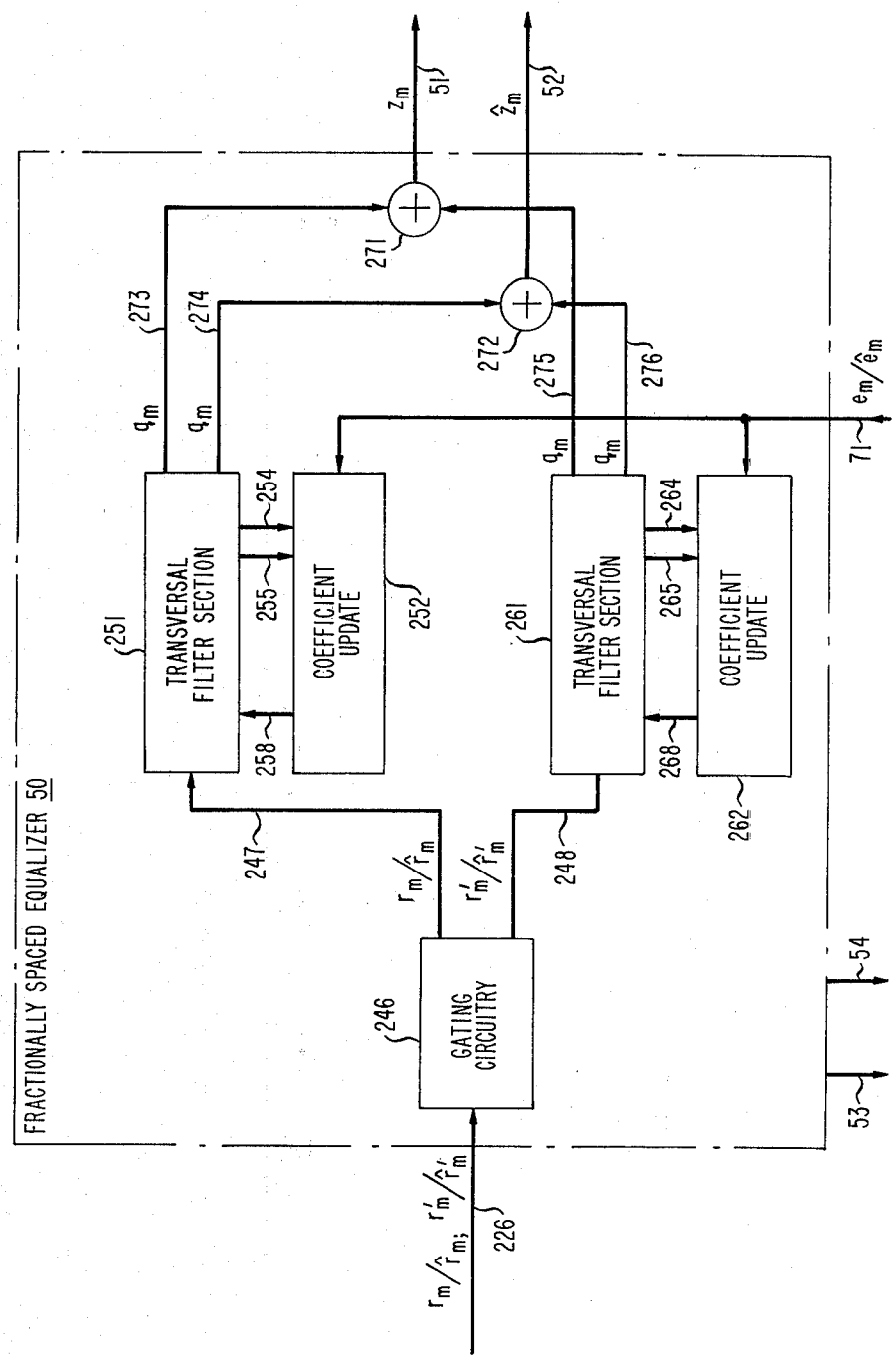
FIG. 2 shows a fractionally spaced equalizer used in the receiver of FIG. 1.

As shown in FIG. 2, in particular, fractionally spaced equalizer 50 includes a transversal filter comprised of two transversal filter sections 251 and 261. Each of the transversal filter sections is adapted to filter samples applied to it at a rate of 1/T samples per second, i.e., spaced at intervals of T seconds. Transversal filter sections 251 and 261 may be realized in any of several ways known in the art, such as with shift registers or random access memories.

In order for the two line samples formed in each interval of T seconds to be applied to respective ones of the two transversal filter sections, equalizer 50 further includes gating circuitry 246. The latter applies components $r_m$ and $\hat{r}_m$ of line sample $R_m$ to filter section 251 and components $r_m'$ and $\hat{r}_m'$ of line sample $R_m'$ to filter section 261. First and second streams of interleaved samples are thus applied to each transversal filter section, the samples of each stream being spaced T seconds apart, i.e., applied to the respective filter section at a rate of 1/T per second. As described in more detail below, the outputs of transversal sections 251 and 261 are combined by adders 271 and 272 to provide the overall filter output.

The transversal filter sections are operated in synchronism. That is, corresponding operations in each filter section are performed concurrently. This, advantageously, allows both filter sections to be controlled via a common set of timing leads (not shown). To this end, gating circuitry 246 holds components $r_m$, $\hat{r}_m$, $r_m'$ and $\hat{r}_m'$ as they appear, one after the other, on lead 26. It thereafter applies component $r_m$ ($\hat{r}_m$) to filter section 251 over lead 247 at the same time as it applies component $r_m'$ ($\hat{r}_m'$) to filter section 261 over lead 248 so that the components on leads 247 and 248 can be clocked into filter sections 251 and 261 concurrently.

The outputs of transversal filter sections 251 and 261 during the $m_{th}$ receiver symbol interval are complex signals $Q_m$ and $Q_m'$ given by $$Q_m = \sum_{i=1}^{2M} C_i(m) R_{m-i+1}$$

and $$Q_m' = \sum_{i=1}^{2M} C_i'(m) R_{m-i+1}'.$$

In these expressions the $C_i(m)$'s and $C_i'(m)$'s, $i = (1 \ldots 2M)$, represent respective ensembles of complex coefficients stored in filter sections 251 and 261, respectively. M is an integer illustratively equal to 16. Each coefficient has a particular value associated with the $m_{th}$ receiver symbol interval and, as can be seen from the above expressions, each coefficient is multiplied by a line sample which bears a predetermined temporal relationship to the most recently formed line sample. Thus, for example, coefficient $C_1'(m)$ is always multiplied by the most recently formed line samples $R_m'$; coefficient $C_1(m)$ is always multiplied by the second most recently formed line sample $R_m$, and so on.

The real and imaginary components of $Q_m$ are $q_m$ and $\hat{q}_m$; those of $Q_m'$ are $q_m'$ and $\hat{q}_m'$. The real and imaginary components of each $C_i(m)$ are $c_i(m)$ and $\hat{c}_i(m)$; those of each $C_i'(m)$ are $c_i'(m)$ and $\hat{c}_i'(m)$. The above expressions for $Q_m$ and $Q_m'$ are thus expressed in terms of their real and imaginary components as $$q_m = \sum_{i=1}^{2M} c_i(m) r_{m-i+1} - \sum_{i=1}^{2M} \hat{c}_i(m) \hat{r}_{m-i+1},$$

-continued $$\hat{q}_m = \sum_{i=1}^{2M} c_i(m)\hat{r}_{m-i+1} + \sum_{i=1}^{2M} \hat{c}_i(m)r_{m-i+1},$$

$$q_m' = \sum_{i=1}^{2M} c_i'(m)r'_{m-i+1} - \sum_{i=1}^{2M} \hat{c}_i'(m)\hat{r}'_{m-i+1}, \text{ and}$$

$$\hat{q}_m' = \sum_{i=1}^{2M} c_i'(m)\hat{r}'_{m-i+1} + \sum_{i=1}^{2M} \hat{c}_i(m)r'_{m-i+1}.$$

Components $q_m$ and $\hat{q}_m$ ($q_m'$ and $\hat{q}_m'$) appear as individual twelve-bit words on output leads 273 and 274 (275 and 276), respectively, of filter section 251 (261). Components $q_m$ and $q_m'$ are added together in adder 271 to form real passband equalizer output component $z_m$ while components $\hat{q}_m$ and $\hat{q}_m'$ are added together in adder 272 to form imaginary passband equalizer output component $\hat{z}_m$.

Updating of the coefficients to provide coefficient values associated with the $(m+1)^{st}$ symbol interval is carried out by coefficient update circuits 252 and 262, respectively. (Although each transversal filter section is shown as being physically distinct from its associated coefficient update unit, the two may, in fact, share common elements, e.g., multipliers and accumulators).

More particularly, coefficient update unit 252 receives sample values and current coefficient values from filter section 251 via leads 254 and 255, respectively. It also receives the remodulated error signal $E_m$ on lead 71. Updated coefficient values, $C_i(m+1)$, generated in response to these three inputs, are returned to filter section 251 on lead 258. In similar fashion, coefficient update unit 262 receives from filter section 261 sample values and current coefficient values on leads 264 and 265, respectively, and it, too, receives the remodulated error signal $E_m$ on lead 71. Updated coefficient values, $C_i'(m+1)$, are returned to filter section 261 on lead 268. The combination of transversal filter section 251 with coefficient update unit 252 comprises a conventional baud equalizer filter, as does the combination of transversal filter section 261 with coefficient update unit 262.

The updating rules illustratively used by coefficient update circuits 252 and 262 are, respectively, $$C_i(m+1) = C_i(m) - \alpha E_m - dR_{m-i-d+1} - \alpha\mu\text{SGN}[C_i(m)]$$

and $$C_i'(m+1) = C_i'(m) - \alpha E_m - dR_{m-i-d+1}' - \alpha\mu\text{SGN}[C_i'(m)],$$

where d is no less than the number of symbol intervals which elapse between the generation of line samples $R_m$ and $R_m'$ and the generation of error signal $E_m$; $\alpha$ and $\mu$ are selected constants and the value of the complex function SGN[X] is $\pm 1 \pm j$ depending on the signs of the real and imaginary components of its complex argument X. These updating rules implement the so-called mean-squared updating algorithm, modified in accordance with the tap leakage technique taught in our above-cited U.S. patent.

The above updating rules are expressed in terms of their real and imaginary components as $$c_i(m+1) = c_i(m) - \alpha e_m - d r_{m-i-d+1} + \alpha \hat{e}_m - d\hat{r}_{m-i-d+1} - \alpha\mu\text{sgn}[c_i(m)],$$

$$\hat{c}_i(m+1) = \hat{c}_i(m) - \alpha e_m - d\hat{r}_{m-i-d+1} - \alpha\hat{e}_m - dr_{m-i-d+1} - \alpha\mu\text{sgn}[\hat{c}_i(m)],$$

$$c_i'(m+1) = c_i'(m) - \alpha e_m - d r'_{m-i-d+1} + \alpha\hat{e}_m - d\hat{r}'_{m-i-d+1} - \alpha\mu\text{sgn}[c_i'(m)]$$

and $$\hat{c}_i'(m+1) = \hat{c}_i'(m) - \alpha e_m - d\hat{r}'_{m-i-d+1} - \alpha\hat{e}_m - dr'_{m-i-d+1} - \alpha\mu\text{sgn}[\hat{c}_i'(m)],$$

where the value of the real function sgn[x] is +1 or −1, depending on the sign of x.

The principles of the present invention will now be explained with reference to FIGS. 3 and 4, each of which depicts the transversal filter coefficients in an ordered plurality or queue. The order of the coefficients within the queue is defined by the order of occurrence of the line samples which these coefficients multiply. Thus, for example, coefficients $C_1'(m)$, $C_1(m)$ and $C_2'(m)$ are the first three coefficients in the queue since they respectively multiply the most recently formed line sample $R_m'$, the second most recently formed line sample $R_m$, and the third most recently formed line sample $R_{m-1}'$.

Figure 3:
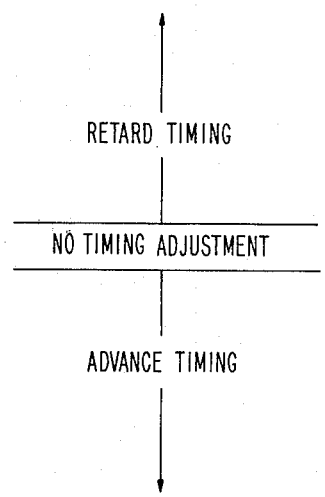
FIG. 3 depicts the above-described prior art coefficient tracking timing recovery technique.

FIG. 3, in particular, depicts the timing recovery technique disclosed in the above-cited Qureshi et al patent. A particular coefficient—illustratively coefficient $C_M(m)$—is designated as one which should have the largest magnitude. This coefficient may be referred to as the "center" coefficient (although it need not be precisely in the center of the coefficient queue). The coefficients preceding coefficient $C_M(m)$, i.e., coefficients $C_1'(m) \ldots C_M'(m)$ are said to be in the "front" of the queue and are multiplied by the more recently formed line samples. Those succeeding coefficient $C_M(m)$, i.e., coefficients $C_{m+1}'(m) \ldots C_{2M}(m)$ are said to be in the "back" of the queue, and are multiplied by the less recently formed line samples.

At regular intervals, e.g., in each symbol interval, the coefficient having the largest magnitude is identified. If it is found to be coefficient $C_M(m)$, no timing adjustment is made. If it is found to be in the front of the coefficient queue, receiver timing (also referred to as the sampling phase) is retarded so that subsequent line samples are formed a little later than they would be if the timing adjustment had not been made. If it is found to be in the back of the queue, receiver timing is advanced, so that subsequent line samples are formed a little sooner than they would be if the timing (phase) adjustment had not been made. In either case, the coefficient values adapt in response to the timing adjustment, the adaptation being such that the magnitude of coefficient $C_M(m)$ increases and ultimately becomes the largest. If, as the result of subsequent coefficient adaptation, coefficient $C_M(m)$ ceases to have the largest magnitude, further timing adjustments are made to again provide it with the largest magnitude. Thus, in typical steady-state operation, any one of the three coefficients can have the largest magnitude, i.e., the center coefficient and the ones on either side of it.

Figure 4:
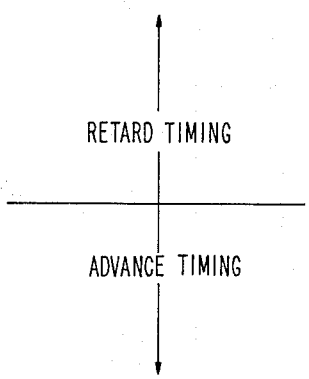
FIG. 4 depicts the above-mentioned first realization of the present coefficient tracking timing recovery technique.

FIG. 4 depicts the timing recovery technique of the present invention. There is no center coefficient; rather, the coefficient queue is divided into two portions only—a front of the queue illustratively comprising coefficients $C_1'(m)$ through $C_M'(m)$ and a back of the queue illustratively comprising coefficients $C_M(m)$ through $C_{2M}(m)$. Receiver timing (sampling phase) is adjusted such that two coefficients, one on either side of the boundary between the front and back portions—typically the coefficients right at the boundary, i.e., coefficients $C_M'(m)$ and $C_M(m)$—are maintained substantially equal in complex magnitude. (Criteria other than complex magnitude might be used).

In particular the location of the coefficient having the largest complex magnitude—referred to as the "reference" coefficient—is identified in each symbol interval. (It may be identified less often if desired). If the reference coefficient is found to be in the front of the queue, a retard signal is generated. Otherwise, i.e., if the reference coefficient is found in the back of the queue, an advance signal is generated. An advance (retard) timing adjustment is made only when the number of advance (retard) signals generated since the last timing adjustment was made exceeds the number of retard (advance) signals by (illustratively) 6. This approach is advantageous, for example, in that the average timing adjustment is made effectively small, thereby minimizing the possibility of overcorrection. In addition, it precludes any timing adjustment if the reference coefficient is alternating rapidly between the front and back portions of the queue; this is an indication that the transmitter and receiver clock frequencies are substantially equal and, thus, no timing adjustment is really necessary.

As a result of the above-described timing recovery process, the location of the reference coefficient, i.e., that having the largest complex magnitude, alternates (over a large number of symbol intervals), in typical steady state operation, between the above-mentioned two coefficients.

Within receiver 10 (FIG. 1), the circuitry which generates advance and retard signals as described above is timing recovery circuit 40. The latter operates in response to the real and imaginary coefficient components provided from equalizer 50 on leads 53 and 54, respectively. It extends the advance and retard signals to receiver timing generator 35 via lead 41 by providing a "0" or "1", respectively, on that lead.

In the embodiment of FIG. 1, the magnitude of the amount by which receiver timing is advanced or retarded, referred to as the timing adjustment increment, is fixed. The timing adjustment increment should be large enough to ensure accurate recovery when the timing transmitter/receiver clock frequency difference is at some predetermined anticipated maximum. The circuitry within receiver timing generator 35 which responds to the lead 41 signal to advance or retard receiver timing may be of conventional design and need not be described in further detail.

Figure 5:
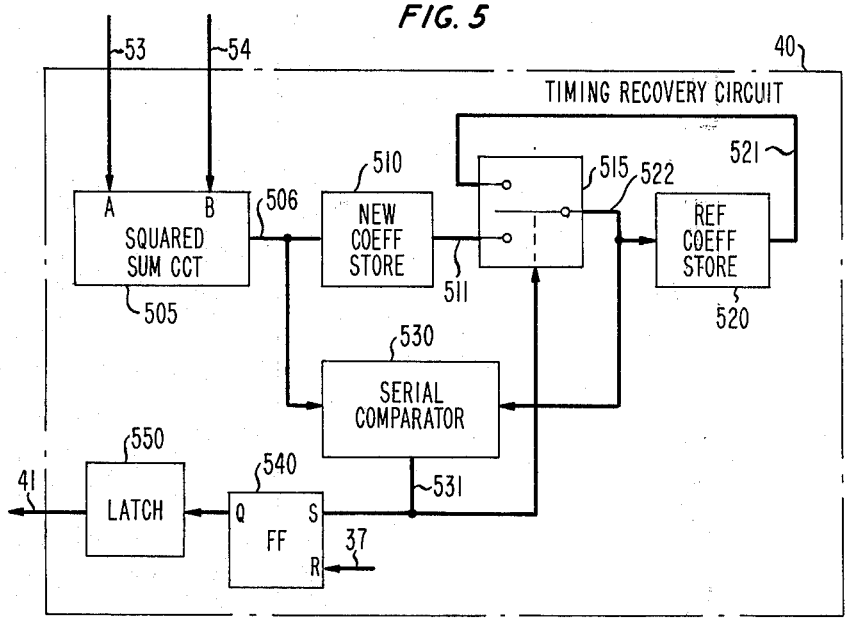
FIG. 5 shows the timing recovery control circuit used in the receiver of FIG. 1.

Attention is directed to FIG. 5, which shows an illustrative realization of timing recovery circuit 40. The 12-bit real and imaginary components of each coefficient are clocked concurrently into squared magnitude circuit 505 of circuit 40 from leads 53 and 54, respectively. Circuit 505 provides on lead 506 a 12-bit number representing the sum of the squares of the real and imaginary components clocked in from leads 53 and 54, referred to herein as the "squared magnitude." (The magnitude of a complex number is equal to the square root of the sum of the squares of its real and imaginary components. However, since the coefficient magnitudes, per se, are not of interest, but only the location of the coefficient having the largest magnitude, it is sufficient to use the sum, i.e., the squared magnitude, without taking the square root. Moreover, if a particular coefficient component is greater than unity, its square may be approximated by its absolute value in forming the squared magnitude. This approach may result in occasional slight errors but, advantageously, avoids having to provide storage capability for large numbers.) Circuit 505 may be realized, for example, as an arithmetic circuit or as a read-only memory look-up table.

Circuit 40 further includes new and reference coefficient stores 510 and 520, respectively. Both stores are illustratively shift registers whose contents are initially cleared. Circuit 40 also includes a serial comparator 530. As the bits of each squared magnitude are clocked serially out of circuit 505 onto lead 506, they are concurrently clocked into both store 510 and a first input of comparator 530. At the same time, the contents of store 520, representing the largest squared magnitude thus far provided by circuit 505 in the current receiver symbol interval, are read out onto lead 521.

Lead 521 extends to a switch 515. Although the latter is represented as a mechanical device to facilitate explanation, it is, in actuality, a gating circuit of conventional design. Assuming that switch 515 is in the up position, the squared magnitude on lead 521 is read back into store 520 via lead 522 and is also applied to the second input of comparator 530. The output signal of comparator 530 is held in a latch internal thereto and is provided on lead 531. If the squared magnitude most recently on lead 506 is not as large as that read out of store 520, comparator output lead 531 is low, i.e., in the "0" state. This causes switch 515, the position of which is controlled by the lead 531 signal, to be maintained in the up position as previously assumed. Thus, the squared magnitude in store 520 will again be read back into that store via lead 522.

If, on the other hand, the squared magnitude most recently on lead 506 is larger than that read out of store 520, lead 531 is high, i.e., in the "1" state. This causes switch 515 to be in the down position. Thus, as the next squared magnitude is clocked into store 510 and comparator 530, it will be compared not to the squared magnitude in store 520, but, rather, to that previously stored in store 510 and now extended to comparator 530 via switch 515 and lead 522. In addition, store 520 will now receive as its input the squared magnitude previously stored in store 510, so that that magnitude will be the one to which the subsequent squared magnitude provided by circuit 505 is compared.

During the time interval that the squared magnitudes of the coefficients in the front of the coefficient queue are read out of circuit 505, a lead 37 (which, although not shown in FIG. 1, extends from timing generator 35) is low. This causes a flip-flop 540 to be held in the reset (output low) state. Thereafter, lead 37 is high. If lead 531 is also thereafter high, flip-flop 540 switches to its set (output high) state. The output of flip-flop 540 being low (high) after all the coefficients have been processed indicates that the coefficient with the largest magnitude was in the front (back) of the coefficient queue.

The output of flip-flop 540 is now latched into latch 550 where it is held until the end of the next symbol interval. The output lead of latch 550 is timing recovery control circuit output lead 41. At this time stores 510 and 520 are cleared in preparation for the next symbol interval.

In the above-described illustrative embodiment, the magnitude of the timing adjustment increment is fixed. This requires a design compromise. As previously noted, the timing adjustment increment should be large enough to ensure accurate timing recovery when the transmitter/receiver clock frequency difference is at some predetermined anticipated maximum, i.e., the worst case. On the other hand, the equalizer performs best when the timing adjustment increment is just barely large enough to compensate for the frequency difference which actually obtains.

These competing conditions are reconciled in accordance with the timing recovery technique disclosed in the copending U.S. patent application of G. J. Kustka, Ser. No. 185,017, filed of even date herewith. In that arrangement, the magnitude of the timing adjustment increment is selected as a function of the location of the largest coefficient; the greater its distance from a reference location, e.g., the boundary between coefficients $C_M(m)$ and $C_{M+1}'(m)$, the larger the increment. This approach, which is illustrated in FIG. 6, results in a near optimum timing adjustment increment no matter what the clock frequency difference.

Figure 6:
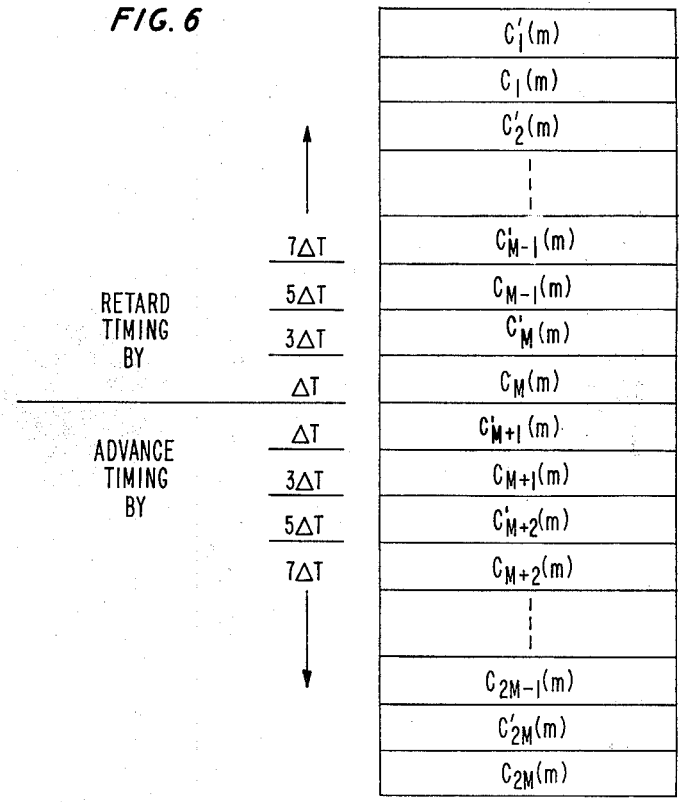
FIG. 6 depicts a second realization of the present coefficient tracking timing recovery technique.

More particularly, FIG. 6 shows that if the coefficient having the largest magnitude is coefficient $C_M(m)$ or coefficient $C_{M+1}'(m)$, timing is respectively retarded or advanced by an amount $\Delta T$. If the coefficient having the largest magnitude is coefficient $C_M'(m)$ or $C_{M+1}(m)$, timing is respectively retarded or advanced by a greater amount, $3\Delta T$, and so forth. This approach again results in steady state operation wherein the location of the largest coefficient magnitude alternates between two coefficients. However, depending on the magnitude of the clock frequency difference, the two coefficients may not be coefficients $C_M(m)$ and $C_{M+1}'(m)$, as in the fixed step size case, but any pair of adjacent coefficients between, in this example, $C_{M-1}'(m)$ and $C_{M+2}(m)$. As long as the coefficient queue is long enough, the fact that the largest coefficient is somewhat displaced from the actual center of the queue does not have a deleterious effect on equalizer performance.

Figure 7:
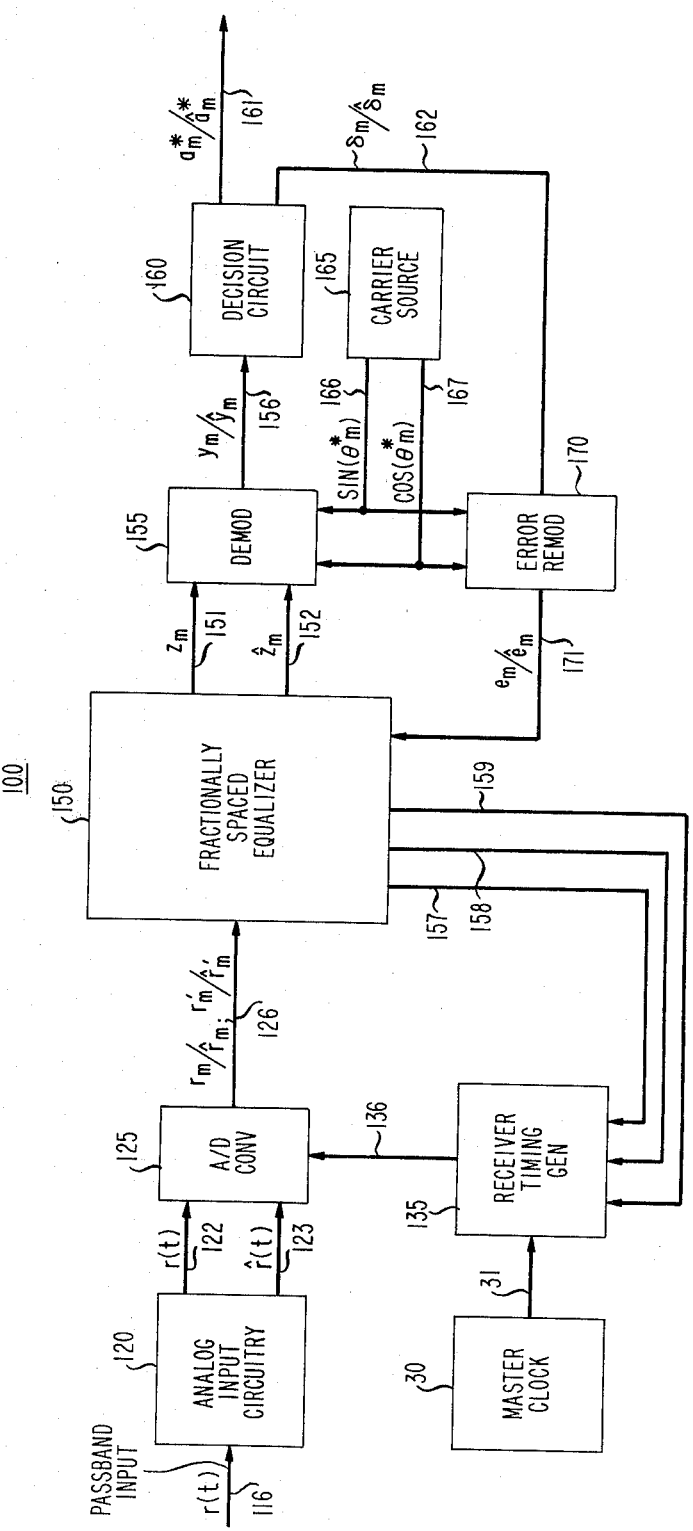
FIG. 7 shows a second illustrative embodiment of a data signal receiver, which employs the timing recovery technique of FIG. 6.

FIG. 7 depicts a receiver 100 which includes timing recovery circuitry embodying the approach of FIG. 6. Receiver 100 is similar to receiver 10 of FIG. 1, with the reference numeral for each element of receiver 100 ending in the same two-digit reference numeral as the corresponding element of receiver 10. Receiver 100 differs from receiver 10 in that its timing recovery control circuitry is shown as being contained within the equalizer, i.e., equalizer 150, as described in detail below. The timing recovery control circuitry, in turn, provides timing control signals to receiver timing generator 135 over leads 157–159. Lead 159, in particular, carries advance and retard signals similar to lead 41 of FIG. 1. The signals on leads 157 and 158 comprise a two-bit word indicating whether the timing adjustment increment is to be $\Delta T$, $3\Delta T$, $5\Delta T$, or $7\Delta T$, per FIG. 6.

The timing adjustment may be made by the receiver timing generator in one step equal to the timing adjustment increment. Preferably, however, it is made in small steps over a number of symbol intervals. For example, the timing adjustment increment may be distributed over seven consecutive symbol intervals. If the increment is $7\Delta T$, a timing adjustment step of $\Delta T$ is made in each of the intervals. If it is $5\Delta T$, five timing adjustment steps of $\Delta T$ are made, with the five steps being distributed as uniformly as possible over the seven intervals, e.g., in the first, third, fourth, fifth and seventh intervals. This approach is preferable because it minimizes the effect of timing adjustments on other receiver processes. (Of course, the timing adjustment increment may be distributed over more (or less) than seven intervals, which need not be consecutive.)

Figure 8:
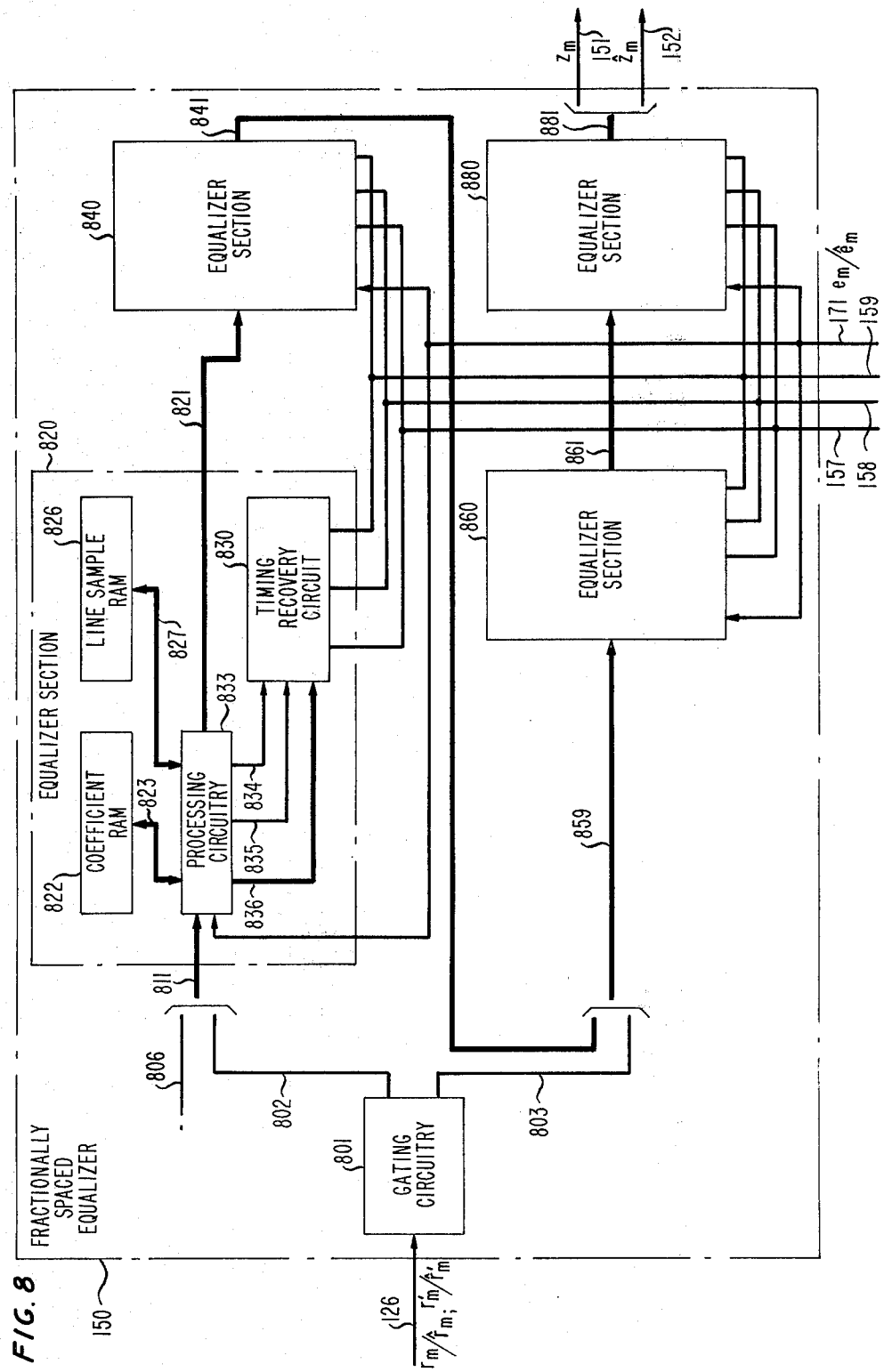
FIG. 8 shows a fractionally spaced equalizer used in the receiver of FIG. 7.

FIG. 8 is an illustrative realization of equalizer 150, which performs the same line sample processing as equalizer 50, but is structured somewhat differently. In particular, equalizer 150 is comprised of four substantially identical equalizer sections 820, 840, 860 and 880. Each of these is adapted to hold M+d complex line signal values and M complex coefficients, the d extra line samples being used for coefficient updating per the above equations. In particular, equalizer sections 820, 840, 860 and 880 respectively hold line samples $R_1$ to $R_{M+d}$, $R_{M+1}$ to $R_{2M+d}$, $R_1'$ to $R_{M+d}'$ and $R_{M+1}'$ to $R_{2M+d}'$ and coefficients $C_1(m)$ to $C_M(m)$, $C_{M+1}(m)$ to $C_{2M}(m)$, $C_1'(m)$ to $C_M'(m)$ and $C_{M+1}'(m)$ to $C_{2M}'(m)$. Illustratively, $M=16$ and $d=2$.

Equalizer 150 further includes gating circuitry 801, which receives line samples $R_m$ and $R_m'$ on lead 126. Line sample $R_m$ is extended to equalizer section 820 via lead 802 of a cable 811. Line sample $R_m'$ is concurrently extended to equalizer section 860 via lead 803 of a cable 859. Upon receiving these line samples, equalizer sections 820 and 860 discard their oldest (least-recently-formed) line samples $R_{m-(M+d)}$ and $R_{m-(M+d)}'$, respectively, and, in addition, transfer their $m^{th}$ oldest line samples $R_{m-M}$ and $R_{m-M}'$, respectively, to equalizer sections 840 and 880 via leads within cables 821 and 861, respectively. Equalizer sections 840 and 880, in turn, discard their oldest line samples $R_{m-(2M+d)}$ and $R_{m-(2M+d)}'$, respectively.

During each symbol interval, each of the equalizer sections multiplies the sixteen line samples stored therein by respective ones of the coefficients stored therein and forms the sum of the resulting products, referred to as a partial sum. Equalizer section 820 thereupon transfers the real and imaginary components of its partial sum to section 840 in serial form via separate leads in cable 821. Equalizer section 840 adds this to its own partial sum and passes the resulting real and imaginary components to section 860 via cable 841 and so on. (To begin the process, a "dummy" partial sum, equal to zero, is applied to equalizer section 820 (by circuitry not shown) over lead 806 of cable 811.) The ultimate equalizer output components $z_m$ and $\hat{z}_m$ are provided by section 880 on leads 151 and 152 of a cable 881. (It will be appreciated that the combination of the partial sums formed by equalizer sections 820 and 840 is equal to the above-described signal $Q_m$, while the combination of the partial sums formed by equalizer sections 860 and 880 is equal to the above-described signal $Q_m'$.) Each equalizer section then updates the coefficient values stored therein in response to real and imaginary error signal components $e_m$ and $\hat{e}_m$ provided on lead 171.

By way of example, FIG. 8 shows the constituents of equalizer section 820. The above-mentioned sixteen line samples $R_1$–$R_{16}$ and sixteen coefficients $C_1(m)$–$C_{16}(m)$ are stored in line samples random access memory (RAM) 826 and coefficient RAM 822, respectively. The actual signal processing, including coefficient updating, is performed by processing circuitry 833. The latter communicates with RAMs 822 and 826 via cables 823 and 827, respectively, and also receives the error signal on lead 171. Circuitry 833 also includes input/output circuitry for RAMs 822 and 826.

Equalizer section 820 further includes a timing recovery circuit 830. This unit has three output leads each connected to a respective one of timing recovery control leads 157–159. As described in detail hereinbelow, timing recovery circuit 830 identifies in each symbol interval the coefficient stored within RAM 822 which has the largest squared magnitude. It also determines the location of that coefficient relative to the other coefficient stored in RAM 822. To this end, timing recovery circuit 830 receives from processing circuitry 833 real and imaginary coefficient components on leads 834 and 835 and coefficient addresses on lead 836.

The timing recovery circuits in the other three equalizer sections operate in the same way as, and concurrently with, circuit 830. All four timing recovery circuits then determine amongst themselves, via an arbitration process to be described, which of them holds the largest squared coefficient magnitude over all. The timing recovery circuit determined to hold the largest squared magnitude takes control of leads 157–159 and, as a function of the location of that coefficient within the overall coefficient queue of FIG. 6, provides on leads 157–159 the appropriate timing control signals.

Figure 9:
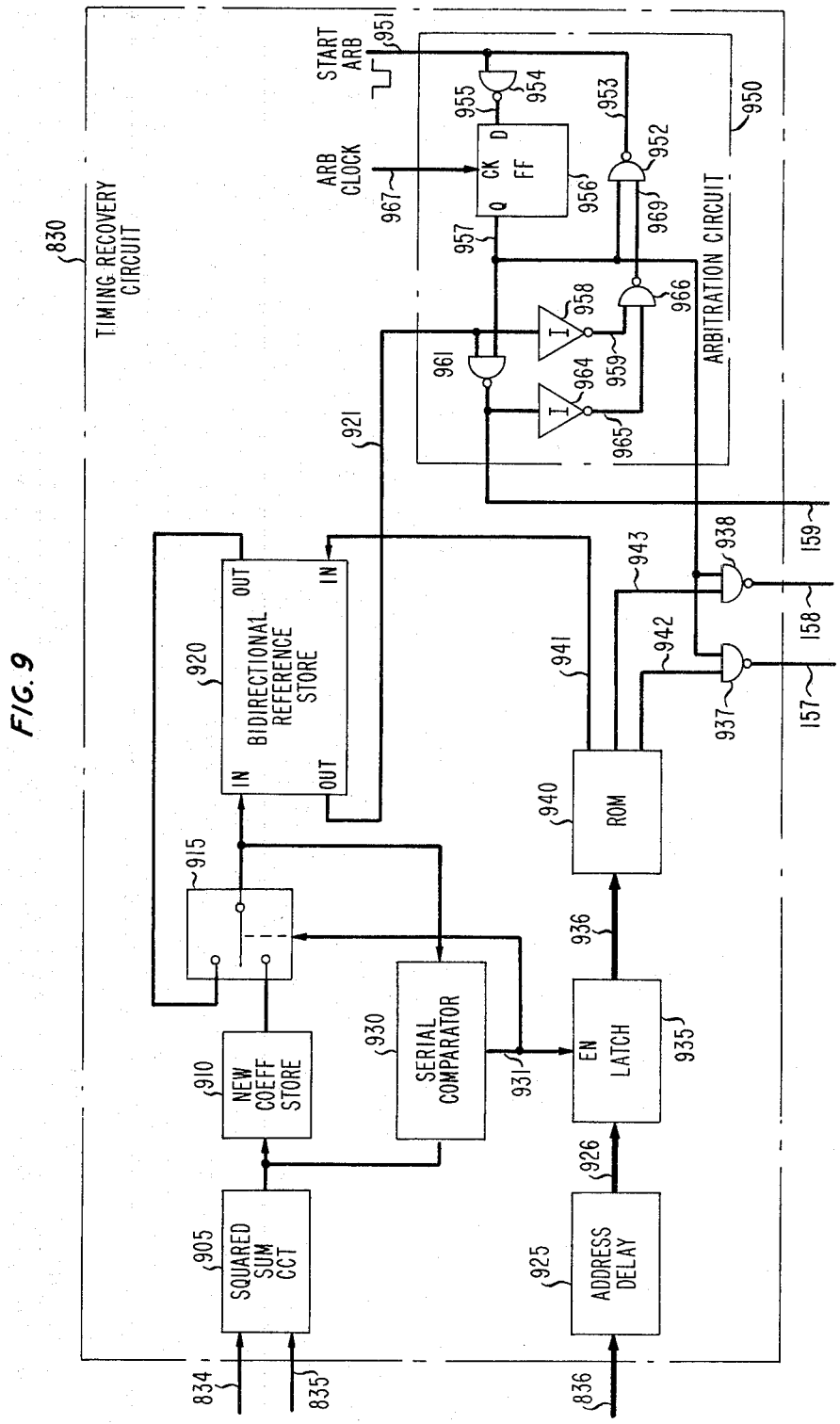
FIG. 9 shows one of four substantially identical timing recovery circuits used in the equalizer of FIG. 8.

FIG. 9 shows an illustrative realization of timing recovery circuit 830 within equalizer section 820. Circuit 830 includes squared sum circuit 905, new coefficient store 910, switch 915, reference store 920 and serial comparator 930. These elements receive via processing circuitry 833 and leads 834 and 835 the coefficient values stored in RAM 822 and operate similarly to circuitry within circuit 40 (FIG. 5.). Thus, once all sixteen coefficients stored in RAM 822 have been processed, reference store 920 holds the largest squared magnitude for those coefficients.

Circuit 830 also includes address delay 925 and latch 935. As each coefficient is presented to circuit 905, its address, i.e., its location within the queue of coefficients stored in equalizer section 820 is presented via lead 836 to delay 925. The delay imparted by the latter is equal to the processing delay in circuit 905 so that as each squared magnitude is presented to new coefficient store 910, its address is concurrently presented to latch 935. Whenever comparator 930 operates switch 915 via lead 931 to cause a new squared magnitude to be entered into reference store 920, it also enables latch 930 (via its enable input EN) to read in and store the associated address.

Timing recovery circuit 830 also includes read-only memory (ROM) 940 which receives in parallel form over cable 936 the address stored in latch 935. Although not shown in FIG. 9, ROM 940 also receives signals which are hard-wired at the time of manufacture to indicate the position of the coefficients stored in RAM 822 within the overall coefficient queue of FIG. 6. In this example, all sixteen coefficients are in the front of the queue.

Based on the signals provided to it, ROM 940 generates on its output leads 941, 942 and 943 the timing recovery control signals which should be provided on leads 159, 157 and 158, respectively, if reference store 920 were, in fact, to hold the largest squared magnitude within all four timing recovery circuits. In particular, lead 941 carries the advance and retard signals and leads 942 and 943 carry the timing adjustment increment magnitude.

Reference store 920 is illustratively a bidirectional shift register. During the determination of largest squared coefficient magnitude, store 920 operates in a shift-right mode, like reference store 520 of circuit 40, so that the least-(most-) significant bit of the squared magnitude stored therein is in the right-most (left-most) stage. When arbitration among the four equalizer sections to determine which holds the largest squared magnitude begins, store 920 is operated in a shift-left mode so that the bits of the squared magnitude stored therein are extended most-significant-bit first to arbitration circuit 950 via lead 921. As each bit is applied to arbitration circuit 950, the corresponding bits of the squared magnitudes stored in the other three timing recovery circuits are concurrently extended to their associated arbitration circuits.

The arbitration circuit of each of the four timing recovery circuits is connected to lead 159, which is normally high. As each bit of the squared magnitude in store 920, for example, is extended to circuit 950, the latter responds by pulling lead 159 low if that bit is a "1" and if, furthermore, circuit 950 has not as yet dropped out of the arbitration. If, on the other hand, that bit is a "0" but lead 159 is pulled low by another one of the timing recovery circuits, circuit 950 drops out of arbitration, i.e., it will no longer pull lead 159 low for the duration of the current arbitration, because this indicates that the squared magnitude stored in the reference store within another timing recovery circuit is larger than that stored in reference store 920.

More particularly, at the start of arbitration, input lead 951 of circuit 950 is pulled low (by circuitry not shown). Thus, the output of NAND gate 954 on lead 955 is high. As each bit is clocked out of store 920, D-type flip-flop 956 is clocked by an arbitration clock pulse on lead 967, which extends from circuitry not shown, so that the high state on lead 955 is stored in the flip-flop and provided at its Q output on lead 957. Lead 951 is thereafter returned to the high state.

Assume that the above-mentioned first bit clocked out of reference store 920 is a "1". The output of NAND gate 961 on lead 159 is thus low. Any of the other three arbitration circuits which receive a "0" from their respective reference stores drop out of the arbitration at this point, i.e., inhibit themselves from pulling lead 159 low; the low state of lead 159 indicates to any such circuits that the reference store in at least one other timing recovery circuit—in this case circuit 830—holds a larger squared magnitude.

Since lead 921 is high, the output of inverter 958 on lead 959 is low and thus the output of NAND gate 966 on lead 969 is high. Since lead 957 is also high, the output of NAND gate 952 on lead 953 is low. Thus, the output of NAND gate 954 on lead 955 is high. Lead 957 thus remains high when flip-flop 956 is clocked in concurrence with the appearance on lead 921 of the second-most-significant bit of the squared magnitude in store 920.

Assume that that second-most-significant bit is a "0" but that the second-most-significant bit of the squared magnitude stored in each of the other timing recovery circuits still in the arbitration is also "0". Lead 159 thus remains high so that the output of inverter 964 on lead 965 is low and the output of NAND gate 966 on lead 969 is high. Thus, leads 953 and 955 are high. Accordingly, lead 957 is still high when flip-flop 956 is clocked in concurrence with the appearance of the third-most-significant squared magnitude bit on lead 921.

Assume, on the one hand, that that third-most-significant bit is a "0" but the third-most-significant bit of the squared magnitude stored in another timing recovery circuit still in the arbitration, is "1". This means that the squared magnitude in store 920 is not the largest and that circuit 950 should drop out of the arbitration. In particular, both inputs to gate 966 are now both high so that lead 969 is low, causing the output of gate 952 on lead 953 to be high. Since lead 951 is also high, lead 955 is low. During arbitration with respect to the fourth-most-significant bit (and all subsequent bits), then, lead 957 is low. This prevents gate 961 from pulling lead 159 low no matter what the subsequent bit values on lead 921. That is, circuit 950 has dropped out of arbitration.

Assume, on the other hand, that the squared magnitude in store 920 is, in fact, the largest over all. In this case one or the other of leads 959 and 965 will always be low (as in the above examples with respect to the most- and second-most-significant bits) and circuit 950 remains in the arbitration to the end. Store 920 thereafter continues to receive shift pulses, causing the advance/retard bit on lead 941, which has been shifted into each stage of store 920 as the squared magnitude bits have been shifted out, to appear on lead 921. Since lead 957 is high, (a) the advance/retard bit value now being shifted onto lead 921 controls the state of lead 159 and (b) the outputs of ROM 940 on leads 942 and 943 control the states of leads 157 and 158 via NAND gates 937 and 938, respectively. At this time, receiver timing generator 135 (FIG. 7) responds to the signals on leads 157-159 to effect the timing adjustment.

If the largest squared magnitude appears in two or more timing recovery circuits, each of their arbitration circuits will attempt to control the states of leads 157-159. As a result, as long as any one of those arbitration circuits specifies a "0" for a particular one of leads 157-159, that lead will, in fact, carry a "0", irrespective of the signals on the other two leads. This may result in an occasional erroneous timing adjustment. Such erroneous adjustments, however, will typically have no significant effect on long term timing recovery. Moreover, the possible deleterious effects of such erroneous timing adjustments can be mitigated by pairing up the various possible signal combinations on leads 157 and 158 with the various timing adjustment increment magnitudes in such a way that the smaller magnitudes are represented by signals having more "0"s, e.g., $\Delta T=00$, $3\Delta T=01$, $5\Delta T=10$, $7\Delta T=11$. In this way, the magnitude of any erroneous timing adjustment will be no larger than the smallest adjustment specified by any of the competing timing recovery circuits.

Although specific embodiments are disclosed herein, these merely illustrate the principles of the invention. For example, the invention can be employed in equalizers using any known coefficient updating rule and with other than T/2 sample spacing, e.g., 3T/4, T/4, 2T/3, etc.

It should thus be appreciated that those skilled in the art will be able to devise various arrangements which, although not specifically shown or described herein, embody the principles of the invention and which, therefore, do not depart from its spirit and scope.

We claim:

1. Apparatus comprising
    means (20, 25, 35) for forming samples of a received signal which represents a succession of data symbols,
    means (55, 60, 65, 251, 261, 271, 272) for forming a decision as to the value of each one of said symbols in response to the sum of the products of an ordered plurality of coefficients with respective ones of said samples and
    means (60, 65, 70, 252, 262) for updating the values of said coefficients,
    characterized by timing recovery means (40) for adjusting the phase of said sample forming means in such a way that a pair of coefficients in said ordered plurality are maintained substantially equal to each other in at least one aspect.

2. The invention of claim 1 wherein said one aspect is coefficient magnitude.

3. The invention of claim 1 wherein each of said coefficients is a complex number and wherein said one aspect is the complex coefficient magnitude.

4. The invention of claims 1, 2 or 3 wherein said pair of coefficients are adjacent to each other in said ordered plurality.

5. Apparatus for use in a receiver to which a data signal representing a succession of data signal values is transmitted comprising
    (a) means (20, 25, 35) for forming samples of said data signal,
    (b) signal processing means operative during each one of a succession of predetermined time intervals including
        means (251, 261) for multiplying ones of said samples, with respective ones of a queue of coefficients, said ones of said samples each bearing a predetermined temporal relationship to the most recently formed one of said samples and each of said coefficients having a predetermined value associated with said one of said intervals,
        circuit means (55, 60, 65, 70) responsive to the sum of the resulting products for forming a decision as to an individual one of said data signal values and for forming a corresponding error signal, and
        means (252, 262) for determining in response to said error signal each coefficient value associated with a subsequent one of said intervals and
    (c) means (505, 510, 515, 530) operative during at least selected ones of said intervals for identifying the then largest of said coefficients,
    (d) characterized by means (540, 550) for adjusting the phase of said sample forming means in such a way that a pair of coefficients in said queue are maintained substantially equal in magnitude.

6. The invention of claim 5 wherein said data signal values are transmitted at a predetermined rate and wherein said samples are formed in excess of said rate.

7. The invention of claims 5 or 6 wherein said pair of coefficients are adjacent to each other in said queue.

8. The invention of claims 5 or 6 wherein each of said coefficients has at least first and second components and wherein the magnitude of each of said coefficients is a predetermined function of said components.

9. The invention of claim 8 wherein said predetermined function is the square root of the sum of the squares of said components.

10. Apparatus comprising
    means (20, 25, 35) for forming samples of a received signal which represents a succession of data symbols,
    means (55, 60, 65, 251, 261, 271, 272) for forming a decision as to the value of each one of said symbols in response to the sum of the products of an ordered plurality of coefficients with respective ones of said samples and
    means (60, 65, 70, 252, 262) for updating the values of said coefficients,
    characterized by timing recovery means (40) for retarding the phase of said sample forming means if an individual one of said coefficients having a predetermined characteristic is within a predetermined portion of said ordered plurality and for advancing said phase if said one of said coefficients is within any of the remainder of said ordered plurality.

11. The invention of claim 10 wherein said one of said coefficients has the largest magnitude of all of said coefficients.

12. The invention of claim 11 wherein each of said coefficients has at least first and second components and wherein the magnitude of each of said coefficients is a predetermined function of said components.

13. The invention of claim 12 wherein said predetermined function is the square root of the sum of the squares of said components.

14. The invention of claims 10, 11 or 12 wherein said symbols occur at a predetermined symbol rate and wherein said samples are formed at a rate in excess of said symbol rate.

15. Apparatus comprising
means (20, 25, 35) for forming samples of a received signal which represents a succession of data symbols,
means (251, 261) for periodically multiplying ones of said samples by respective ones of an ordered plurality of coefficients to form a plurality of products, each of said ones of said samples bearing a predetermined temporal relationship to the most recently formed one of said samples,
means (55, 60, 65, 70, 271, 272) for forming decisions as to the values of individual ones of said symbols in response to respective pluralities of products formed by said multiplying means and for forming error signals each associated with a respective one of said decisions, and
means (252, 262) for modifying the values of said coefficients in response to at least one of said error signals,
characterized by timing recovery means (40) for repetitively adjusting the phase of said sample forming means as a function of the location of an identified one of said coefficients relative to the boundary between a pair of said coefficients which are adjacent to each other in said ordered plurality.

16. The invention of claim 15 wherein said identified coefficient is the one of said coefficients having the largest magnitude.

17. The invention of claims 15 or 16 wherein said timing recovery means advances said phase if said identified coefficient is on one side of said boundary and retards said phase if said identified coefficient is on the other side of said boundary.

18. The invention of claim 17 wherein said symbols occur at a predetermined symbol rate and wherein said samples are formed at a rate in excess of said symbol rate.

19. Apparatus for use in a receiver to which a data signal representing a succession of data signal values is transmitted comprising
(a) means (20, 25, 35) for forming samples of said data signal,
(b) signal processing means operative during each one of a succession of predetermined time intervals including
means (251, 261) for multiplying ones of said samples with respective ones of a queue of coefficients, said ones of said samples each bearing a predetermined temporal relationship to the most recently formed one of said samples and each of said coefficients having a predetermined value associated with said one of said intervals,
circuit means (55, 60, 65, 70) responsive to the sum of the resulting products for forming a decision as to an individual one of said data signal values and for forming a corresponding error signal, and
means (252, 262) for determining in response to said error signal each coefficient value associated with a subsequent one of said intervals
(c) means (505, 510, 515, 520, 530) operative during at least selected ones of said intervals for identifying the then largest of said coefficients, and
(d) means (540, 550) for retarding the phase of said sample forming means if said largest coefficient is within a first portion of said queue and for advancing said phase if said largest coefficient is within a second portion of said queue,
(e) characterized in that said first and second portions are immediately adjacent to each other in said queue.

20. The invention of claim 19 wherein the coefficients of said first and second portions are those with which said multiplying means multiplies the more recently formed ones of said samples and the less recently formed ones of said samples, respectively.

21. The invention of claims 19 or 20 wherein said data signal is a modulated data signal, and said circuit means includes means (55, 65) for demodulating said sum to form a baseband output, and means (60) for forming said decision in response to said baseband output.

22. The invention of claims 19 or 20 wherein each of said coefficients is comprised of at least first and second components and wherein said identifying means identifies as said largest coefficient the coefficient for which the sum of the squares of its components is the largest.

23. Apparatus for processing a received data signal representing a succession of data symbols occurring a 1/T symbols per second comprising
means (20, 25, 35) for forming samples of said data signal at a rate in excess of 1/T samples per second,
means (251, 261) operative during each of a succession of T second intervals for multiplying successive ones of an ordered plurality of coefficients with respective successive ones of said samples to form a plurality of products, said ones of said samples each bearing a predetermined temporal relationship to the most recently formed one of said samples,
means (55, 60, 65) for forming in response to the sum of each said plurality of products a decision as to the value of a respective one of said data symbols and
means (60, 65, 70, 252, 262) for periodically updating the values of said coefficients,
characterized by means (40) operative during at least selected ones of said intervals for retarding the phase of said sample forming means if the then largest one of said coefficients is within a predetermined portion of said ordered plurality and for advancing said phase if said largest coefficient is within any of the remainder of said ordered plurality.

24. The invention of claim 23 wherein the coefficients of said predetermined portion are those with which said multiplying means multiplies the more recently formed ones of said samples.

* * * * *